United States Patent [19]

Johnson et al.

[11] Patent Number: 5,286,561
[45] Date of Patent: Feb. 15, 1994

[54] POLY(ARYLENE SULFIDE)COMPOSITES AND METHODS OF PRODUCTION

[75] Inventors: Timothy W. Johnson; Lacey E. Scoggins, both of Bartlesville, Okla.

[73] Assignee: Phillips Petroleum Company, Bartlesville, Okla.

[21] Appl. No.: 4,604

[22] Filed: Jan. 14, 1993

Related U.S. Application Data

[62] Division of Ser. No. 734,931, Jul. 24, 1991, Pat. No. 5,210,128.

[51] Int. Cl.$^5$ ............................................. D02G 3/00
[52] U.S. Cl. ............................... 428/375; 428/542.8; 428/288; 264/165; 264/241; 264/178 R
[58] Field of Search ............... 264/165, 241, 178 R; 428/375, 542.8

[56] References Cited

U.S. PATENT DOCUMENTS

| | | | |
|---|---|---|---|
| 3,354,129 | 11/1967 | Edmonds, Jr. et al. | 260/79 |
| 3,607,843 | 9/1971 | Vidaurri, Jr. | 260/79 R |
| 3,634,355 | 1/1972 | Barr et al. | 528/223 |
| 3,919,177 | 11/1975 | Campbell | 260/79.1 |
| 3,953,400 | 4/1976 | Dahl | 260/47 R |
| 3,966,688 | 6/1976 | Campbell | 260/79 |
| 3,988,286 | 11/1976 | Edmonds, Jr. et al. | 260/37 R |
| 4,089,847 | 5/1978 | Edmonds, Jr. et al. | 528/374 |
| 4,176,222 | 11/1979 | Cinderey et al. | 528/126 |
| 4,415,729 | 11/1983 | Scoggins et al. | 528/388 |
| 4,421,588 | 12/1983 | Davies | 156/308.2 |
| 4,447,581 | 5/1984 | Quella et al. | 525/189 |
| 4,501,713 | 2/1985 | Wright | 264/176 R |
| 4,590,104 | 5/1986 | Zeiner et al. | 427/389.9 |
| 4,656,231 | 4/1987 | Tieszen et al. | 525/537 |
| 4,659,789 | 4/1987 | Katto et al. | 525/537 |
| 4,680,224 | 7/1987 | O'Connor | 424/294 |
| 4,684,699 | 8/1987 | Robeson | 525/471 |
| 4,690,972 | 9/1987 | Johnson et al. | 524/609 |
| 4,820,759 | 4/1989 | Ichikawa et al. | 524/413 |
| 4,837,294 | 6/1989 | Ichikawa et al. | 528/388 |
| 5,079,290 | 1/1992 | Wright | 525/537 |
| 5,210,128 | 5/1993 | Johnson | 524/609 |

FOREIGN PATENT DOCUMENTS

| | | |
|---|---|---|
| 0062830A1 | 10/1982 | European Pat. Off. |
| 0286298A2 | 12/1988 | European Pat. Off. |
| 0287396A2 | 12/1988 | European Pat. Off. |
| 2026655 | 1/1972 | Fed. Rep. of Germany |
| 62-45654 | 2/1987 | Japan |
| 2192831A | 1/1988 | United Kingdom |

OTHER PUBLICATIONS

European Patent Application (EPA) 0388969 published Sep. 26, 1990.
European Patent Application (EPA) 0409105 published Jan. 23, 1991.
Schlack, Mark, editor, "The Next Generation", *Plastics World*, Jun. 1986, pp. 35-39.

*Primary Examiner*—George F. Lesmes
*Assistant Examiner*—Chris Raimund
*Attorney, Agent, or Firm*—Dougherty, Hessin, Beavers & Gilbert

[57] ABSTRACT

The present invention provides: (a) a method for producing a poly(arylene sulfide)(PAS) resin composition: (b) a PAS resin composition produced by the inventive resin composition production method; (c) a method which utilizes the inventive PAS resin composition in the production of a continuous fiber-reinforced composite; and (d) a PAS composite produced by the inventive composite production method. The PAS resin composition produced by the inventive resin composition production method comprises a crystallizable arylene sulfide polymer and a nucleating agent. The nucleating agent is admixed with the crystallizable arylene sulfide polymer by adding said nucleating agent to the polymerization reaction system. The inventive PAS resin composition solidifies to a fine-grained crystalline morphology and is well suited for use in the production of continuous fiber-reinforced composites, molded articles, and other products.

8 Claims, No Drawings

POLY(ARYLENE SULFIDE) COMPOSITES AND METHODS OF PRODUCTION

This is a divisional of copending application(s) Ser. No. 07/734,931 filed on Jul. 24, 1991, now U.S. Pat. No. 5,210,128.

BACKGROUND OF THE INVENTION

In one aspect, the present invention relates to poly(arylene sulfide) (PAS) resin compositions and to methods of producing PAS resin compositions. In another aspect, the present invention relates to continuous fiber-reinforced PAS composites and to methods of producing continuous fiber-reinforced PAS composites.

Due to their thermal resistance, chemical resistance, and desirable mechanical properties, PAS resins, e.g., poly(phenylene sulfide) (PPS) resins, are widely used for the production of coatings, fiber-reinforced composites, molded articles, laminates, and the like. Continuous fiber-reinforced PAS composites and laminates, for example, are lightweight, strong, non-rusting, chemical resistant, and heat resistant. Thus, PAS resin composites and laminates can advantageously be used to replace materials such as steel, wood, aluminum, etc. in the production of numerous items and structures (e.g., frames, supports, gratings, ladders, walkways, guardrails, tubes, pipes, etc.).

As is known in the art, the physical properties of a finished PAS resin product are determined, to a large extent, by the crystalline nature of the PAS resin. Solidification of the PAS resin to a fine-grained crystalline morphology improves the strength, impact resistance, heat deflection characteristics, and creep resistance of the PAS resin product and increases the product's maximum use temperature. When a PAS resin composition containing a reinforcing material is used, solidification of the PAS resin to a fine-grained crystalline morphology further improves the physical properties of the PAS resin product by improving the interfacial adhesion between the PAS resin and reinforcing material.

Various techniques have been used to improve the crystalline morphologies of finished PAS products. For example, the crystalline morphologies of some injection molded PAS products have been improved by using a relatively high temperature mold. The crystalline morphologies of certain compression molded PAS products have been improved through the use of a two-step procedure wherein the compression molded PAS product is rapidly cooled, i.e., quenched, to room temperature and subsequently annealed in order to produce a fine-grained crystalline structure.

As explained in U.S. Pat. No. 4,690,972, the entire disclosure of which is incorporated herein by reference, the crystalline morphology of a finished PAS product can also be improved through the incorporation of one or more nucleating agents. In the process of U.S. Pat. No. 4,690,972, a small amount of a nucleating agent (e.g., a poly(arylene ether ketone) or a poly(arylene sulfide/ketone)) is mixed with a PAS resin. The PAS/nucleating agent blend is then heated to a temperature above the melting point of the PAS resin and allowed to cool at a rate of less than about 50° C. per minute. Although the manner in which the nucleating agent operates is not fully understood, it is believed that, by providing nucleating sites throughout the PAS resin, the nucleating agent facilitates the initiation of the crystallization process and causes rapid and extensive crystallization to occur in the PAS resin. The relative effectiveness of a given nucleating agent is measured by the amount by which the agent increases the melt crystallization temperature ($T_{mc}$) of the PAS resin and/or the amount by which the agent reduces the size of the spheralitic structures which form in the resin during the crystallization process.

Using nucleating agents to obtain highly crystalline PAS products can provide significant advantages over the high temperature molding and quench/annealing techniques mentioned above. For example, using a nucleating agent to obtain a fine-grained crystalline morphology generally simplifies the crystallization process and reduces equipment requirements.

Unfortunately, current PAS/nucleating agent blending techniques of the type described in U.S. Pat. No. 4,690,972 do not provide PAS/nucleating agent blends which are well suited for use in the production of continuous fiber-reinforced composites. In U.S. Pat. No. 4,690,972, continuous fiber-reinforced PAS composites are prepared by: (a) grinding (e.g., air milling) a PAS resin and polymeric nucleating agent to a finely divided form; (b) blending the nucleating agent with the PAS resin before, during, or after the grinding procedure; (c) preferably, slurrying the finely divided PAS/nucleating agent mixture using an inert carrier liquid (e.g., water); and (d) pulling the continuous fiber-reinforcing material through the PAS/nucleating agent slurry. Due to the fact that the PAS resin and polymeric nucleating agent components of the PAS/nucleating agent blend generally have different susceptibilities to the grinding techniques used in the art, however, the PAS resin and nucleating agent components of the blend typically do not have the same particle size (i.e., the PAS resin particles are generally either larger or smaller than the nucleating agent particles). As is known in the art, the continuous reinforcement material will more readily retain the component of the PAS/nucleating blend which has the larger particle size. Consequently, blending and impregnation techniques such as those described in U.S. Pat. No. 4,690,972 do not provide uniform PAS resin and nucleating agent concentrations along the length and over the cross-section of the continuous reinforcement material.

Arylene sulfide polymers are typically produced by solution polymerization processes wherein at least one dihalo-arylene reactant compound is reacted with a sulfur source (e.g., an alkali metal sulfide) in the presence of a polar organic solvent. Modified arylene sulfide polymers can be obtained by adding polymerization modifying compounds to the reaction system. Examples of such polymerization modifying compounds include: polyhalo-arylene compounds, which can be added to the reaction system to promote polymer chain branching; monohalo-arylene sulfide compounds, which can be added to the reaction system to cause polymer chain termination; and alkali metal carboxylates, which can be added to the reaction system to promote the formation of a polymer of increased molecular weight. Upon the substantial completion of the polymerization process, the arylene sulfide polymer product is typically recovered from the reaction system using either a "solvent flashing" technique or a "quench recovery" technique.

The solvent flashing technique is described, for example, in U.S. Pat. Nos. 4,656,231 and 4,415,729, the entire disclosures of which are incorporated herein by reference. In the solvent flashing technique, the pressure of the reaction system is first reduced by an amount sufficient to cause a portion of the polar organic solvent to flash (i.e., vaporize) out of the reaction system. The resulting concentrated reaction system is then reheated and repressurized. Subsequently, the pressure of the concentrated reaction system is reduced by an amount sufficient to flash away the remainder of the polar organic solvent and leave a powdery, crude polymer product. The crude polymer product is then washed and dried in order to remove reaction system impurities.

The quench recovery technique is described, for example, in U.S. Pat. No. 4,415,729, the entire disclosure of which has been incorporated herein by reference. In the quench recovery technique, a molten polymer product phase is formed in the liquid reaction system. Subsequently, the temperature of the reaction system is reduced sufficiently (i.e., quenched) to cause the formation of a solid particulate polymer product. The solid polymer product is then filtered out of the reaction system, washed, and dried.

The PAS polymerization and recovery methods used heretofore have various shortcomings. The quench recovery and solvent flashing techniques discussed above yield crude polymer products which are loaded with impurities. The washing and drying procedures required to remove impurities from the arylene sulfide polymer product are time consuming and costly and typically result in significant polymer product losses. Additionally, the recovery processes described above typically yield feathery polymer products which have low bulk densities. Feathery polymer particles tend to plug the filtration equipment used to separate a quench recovered polymer from its reaction system while a low product polymer bulk density creates downstream processing and handling difficulties. The polymer product particles produced in the quench recovery process also tend to retain large amounts of the polymerization solvent. Solvent retention creates additional polymer purification and solvent recovery problems and leads to substantial product and solvent losses.

Therefore, a need presently exists for a PAS polymerization/recovery process which produces a compact, solid polymer product which is more readily separated from the polymerization system. A need also exists for a PAS polymerization/recovery process which produces a polymer product of increased bulk density. An additional need presently exists for a PAS polymerization/recovery process which yields a purer polymer product and reduces solvent retention. Further, a need currently exists for a PAS/nucleating agent mixing technique which provides a uniform PAS/nucleating agent blend which is well suited for use in the production of continuous fiber-reinforced composites.

SUMMARY OF THE INVENTION

The present invention provides a novel method for producing a poly(arylene sulfide) resin composition and a novel PAS resin composition produced by the inventive resin composition production method. The novel PAS resin composition provided by the present invention comprises a crystallizable arylene sulfide polymer and a nucleating agent. The inventive resin composition production method comprises the steps of: (a) forming a reaction system which initially comprises (i) polymerization reactants which are reactable to form the crystallizable arylene sulfide polymer and (ii) a solvent; (b) reacting the polymerization reactants to form the crystallizable arylene sulfide polymer; (c) after step (a), adding the above-mentioned nucleating agent to the reaction system; and (d) after steps (b) and (c), recovering the novel PAS resin composition from the reaction system.

The present invention also provides a novel method of preparing a continuous fiber-reinforced PAS composite and a novel PAS composite produced by the inventive composite production method. The inventive composite production method comprises the step of impregnating a continuous fiber material with a PAS resin composition. The PAS resin composition used in the inventive composite production method is a resin composition which (a) comprises a crystallizable arylene sulfide polymer and a nucleating agent and (b) has been produced by the inventive resin composition production method described above.

The present invention addresses each of the polymer recovery problems discussed hereinabove. The inventive resin composition production method provides a compact, high bulk density, PAS composition product which is easily separated from the polymerization system and is easily handled and processed. Additionally, the PAS resin composition produced by the inventive resin composition production method has a tighter, more fine-grained crystalline structure which retains less polymerization solvent and less impurities.

The novel PAS/nucleating blend composition provided by the present invention is also well suited for use in the production of uniform, continuous fiber-reinforced composites. When the inventive PAS resin composition is ground to a finely divided form using conventional polymer resin grinding techniques (e.g., air milling, ball milling, etc.), each particle of the resulting finely divided composition contains both PAS resin and nucleating agent. Additionally, the weight ratio of PAS resin to nucleating agent in each particle is equivalent to the PAS resin to nucleating agent weight ratio of the overall composition. Thus, regardless of which particles of the inventive composition are preferentially retained by the continuous reinforcement material during the impregnation process, uniform PAS resin and nucleating agent concentrations are obtained along the length and over the cross-section of the continuous reinforcement.

Other and further objects, features, and advantages of the present invention will be readily apparent to those skilled in the art upon reading the following description of the preferred embodiments.

DESCRIPTION OF THE PREFERRED EMBODIMENTS

The present invention provides a novel method for producing a PAS resin composition and a novel resin composition produced by said method. The novel PAS resin composition provided by the present invention comprises a crystallizable arylene sulfide polymer (referred to hereinafter as the primary poly(arylene sulfide) resin component of the inventive composition) and a nucleating agent. The inventive method by which the novel composition is produced generally comprises the steps of: (a) forming a reaction system which initially comprises (i) a solvent and (ii) polymerization reactants which are reactable to form the crystallizable arylene sulfide polymer; (b) reacting the polymerization reactants to form the crystallizable arylene sulfide polymer; (c) after step (a), adding the above-mentioned nucleating agent to the reaction system; and (d) after steps (b) and (c), recovering the novel PAS resin composition from the reaction system. The nucleating agent is preferably added to the reaction system at or near the end of step (b).

The inventive resin composition production method can generally be used in conjunction with any solution polymerization process for producing a crystallizable arylene sulfide polymer. As used herein and in the claims, the terms "arylene sulfide polymer" and "poly(arylene sulfide)" designate crystallizable polymers, preferably homopolymers, composed of arylene sulfide repeating units of the type described in U.S. Pat. No. 3,354,129, the entire disclosure of which is incorporated herein by reference.

Although the primary poly(arylene sulfide) resin component of the inventive resin composition (i.e., the arylene sulfide polymer produced in step (b) of the inventive resin composition production method) can generally be any crystallizable polymer composed of arylene sulfide repeating units of the type described in U.S. Pat. No. 3,354,129, the arylene sulfide polymer produced in step (b) will preferably have a melting point in the range of from about 250° to about 300° C. and a melt crystallization temperature in the range of from about 150° to about 250° C. Such polymers are particularly well suited for use in conjunction with the preferred polymeric nucleating agents described hereinbelow.

The polymer formed in step (b) of the inventive resin composition production method is preferably an arylene sulfide polymer wherein: at least about 99% of the divalent polymeric repeating units are repeating units of the formula:

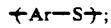

Ar is a divalent arylene group selected from

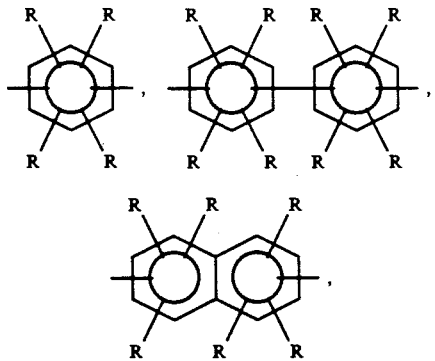

or a combination thereof; each R group is independently selected from hydrogen, alkyl, cycloalkyl, aryl or a combination thereof; each R group is preferably hydrogen; and, in each of the repeating units, the total number of carbon atoms in said R groups is in the range of from 0 to about 18. Ar is preferably p-phenylene, p-biphenylene, or 2,6-naphthylene. Most preferably, at least about 90% of the divalent repeating units of the arylene sulfide polymer are p-phenylene sulfide repeating units of the formula:

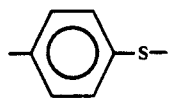

Solution polymerization methods for producing arylene sulfide polymers having the structures and properties described above are disclosed, for example, in U.S. Pat. Nos. 3,354,129, 3,919,177, 4,415,729, and 4,656,231, the entire disclosures of which are incorporated herein by reference.

The solution polymerization methods disclosed in U.S. Pat. Nos. 3,354,129, 3,919,177, 4,415,729, and 4,656,231 are well suited for use in conjunction with the inventive resin composition production method. In these solution polymerization methods, an arylene sulfide polymer is formed by reacting at least one dihaloarylene reactant compound and a sulfur source (e.g., an alkali metal sulfide) in the presence of a polar organic solvent. Consequently, when these solution polymerization methods are used in conjunction with the inventive resin composition production method, the reaction system formed in step (a) of the inventive method will initially comprise: at least one dihalo-arylene reactant compound, a sulfur source (e.g., an alkali metal sulfide), and a polar organic solvent.

The nucleating agent used in the present invention should be a compound which will modify the crystallization characteristics of the primary poly(arylene sulfide) resin component of the inventive resin composition by promoting the formation of a fine-grained crystalline morphology. The nucleating agent is preferably a polymer, or polymer blend, which (a) is compatible with (i.e., suitable for blending with) the primary poly(arylene sulfide) resin component and (b) is sufficiently crystallizable to yield a heat of fusion of at least about 10 Joules per gram. Nucleating polymer additives preferred for use in the present invention will have melting points and melt crystallization temperatures which exceed, respectively, the melting point and melt crystallization temperature of the primary poly(arylene sulfide) resin component. Nucleating polymer additives having melting points at least about 20° C. above the melting point of the primary poly(arylene sulfide) resin component are particularly well suited for use in the present invention. Nucleating polymer additives having melting points in the range of from about 40° to about 100° C. above the melting point of the primary poly(arylene sulfide) resin component are most preferably used in the present invention.

Examples of polymeric nucleating agents preferred for use in the present invention include: poly(arylene ether/ketone) resins; poly(arylene sulfide/ketone) resins; biphenylene sulfide homopolymer resins; biphenylene sulfide/phenylene sulfide copolymer resins; and combinations thereof. The nucleating agent used in the present invention is most preferably selected from the group consisting of: poly(arylene ether/ketone) resins; poly(arylene sulfide/ketone) resins; and combinations thereof. However, the nucleating agent used in the present invention is preferably not a polymeric additive which is substantially structurally identical to the primary poly(arylene sulfide) resin component of the inventive resin composition. Rather, as set forth above, the nucleating agent is preferably a polymer, or polymer blend, having both a melting point and a melt crystallization temperature which exceed, respectively, the melting point and the melt crystallization temperature of the primary poly(arylene sulfide) component.

As used herein and in the claims, the term "biphenylene sulfide homopolymer" refers to a homopolymer composed of repeating units of the formula:

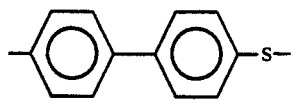

The term "biphenylene sulfide/phenylene sulfide copolymer", as used herein and in the claims, refers to a copolymer composed of (a) biphenylene sulfide repeating units of the formula:

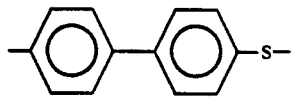

and (b) phenylene sulfide repeating units of the formula:

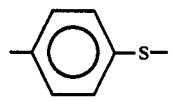

The biphenylene sulfide homopolymer used in the present invention will preferably have a melting temperature in the range of from about 300° C. to about 475° C. and a melt crystallization temperature in the range of from about 250° C. to about 420° C. The biphenylene sulfide homopolymer will most preferably have a melting temperature in the range of from about 360° C. to about 450° C. and a melt crystallization temperature in the range of from about 275° C. to about 420° C.

The biphenylene sulfide/phenylene sulfide copolymer used in the present invention will preferably have a biphenylene sulfide:phenylene sulfide repeating unit ratio in the range of from about 95:5 to about 70:30. The biphenylene sulfide/phenylene sulfide copolymer will most preferably have a biphenylene sulfide:phenylene sulfide repeating unit ratio of about 9:1. The biphenylene sulfide/phenylene sulfide copolymer will also preferably have a melting point of about 405° C. and a melt crystallization temperature of about 360° C.

A method for producing biphenylene sulfide homopolymers and biphenylene sulfide/phenylene copolymers suitable for the use in the present invention is described, for example, in U.S. Pat. No. 3,354,129, the entire disclosure of which has been incorporated herein by reference.

As used throughout this description and in the claims, the term "poly(arylene sulfide/ketone)" designates a polymer (preferably a homopolymer) wherein: at least about 20% (preferably at least about 99%) of the divalent polymeric repeating units are repeating units of the formula:

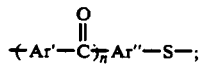

n=1 or 2; and Ar' and Ar" are independently selected from phenylene, biphenylene, naphthylene, biphenylene ether, or lower alkyl-substituted derivatives of these arylene groups. As used herein, the term "lower alkyl" refers to alkyl groups having from 1 to about 6 carbon atoms. Preferably, Ar' and Ar" are independently selected from unsubstituted p-phenylene and lower alkyl-substituted p-phenylene. The poly(arylene sulfide/ketone) most preferred for use in the present invention is an unsubstituted p-phenylene sulfide/ketone polymer (preferably a homopolymer) wherein at least about 20% (preferably at least about 99%) of the divalent polymeric repeating units are repeating units of the formula:

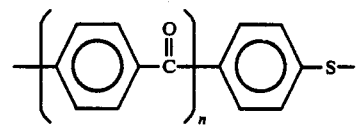

and n=1 or 2.

The poly(arylene sulfide/ketones) used in the inventive composition are preferably insoluble in 1-chloronaphthylene at 200° C. The poly(arylene sulfide/ketones) used in the present invention also preferably have reduced viscosities in the range of from about 0.3 to about 3 as determined at 25° C. in a 98% by weight sulfuric acid solution using a polymer concentration of 0.5 g/100 mL of solution.

Methods for preparing poly(arylene sulfide/ketones) suitable for use in the present invention are described, for example, in U.S. Pat. Nos. 4,590,104 and 3,634,355, the entire disclosures of which are incorporated herein by reference.

As used throughout this description and in the claims, the term "poly(arylene ether/ketone)" designates a polymer (preferably a homopolymer) wherein: at least about 20% (preferably at least about 99%) of the divalent polymeric repeating units are repeating units of the formula:

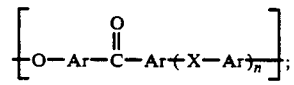

each Ar group is a divalent arylene radical independently selected from phenylene, biphenylene or naphthalene; each Ar group is preferably an unsubstituted divalent arylene radical; X is O, C=O, or a direct bond; and n is an integer of from 0 to 3. Preferably, each Ar group is an unsubstituted p-phenylene group, X is O, and n is 0 or 1. The poly(arylene ether/ketone) preferred for use in the inventive method is an unsubstituted p-phenylene etherether ketone polymer (preferably a homopolymer) wherein at least about 20% (preferably at least about 99%) of the divalent polymeric repeating units are repeating units of the formula:

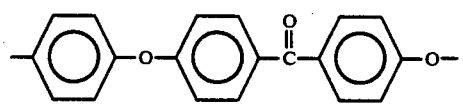

The poly(arylene ether/ketone) used in the present invention preferably has a reduced viscosity in the range of from about 0.6 to about 3, as measured in a 98% by weight sulfuric acid solution at 25° C. and using a polymer concentration of 0.5 g/100 mL of solution. Methods of preparing poly(arylene ether/ketones) suitable for use in the inventive method are described, for example, in U.S. Pat. Nos. 4,684,699, 4,176,222, and 3,953,400, the entire disclosures of which are incorporated herein by reference.

The nucleating agent used in the present invention is generally added to the reaction system in step (c) of the inventive resin composition production method in an amount sufficient to alter the crystallization characteristics of the primary poly(arylene sulfide) resin component of the inventive composition (i.e., the crystallizable arylene sulfide polymer being produced in step (b)) by promoting the formation of a fine-grained crystalline morphology. The nucleating agent will typically be added to the reaction system in an amount in the range of from about 0.01 to about 30% by weight based on the combined weight of the nucleating agent and the monomer reactant compound(s) being used to produce the crystallizable arylene sulfide polymer. The nucleating agent is preferably added to the reaction system in an amount in the range of from about 0.1% to about 10% by weight based on the combined weight of the nucleating agent and the monomer reactant compound(s).

In a particularly preferred embodiment of the present invention: at least about 90% of the divalent repeating units of arylene sulfide polymer produced in step (b) of the inventive resin composition production method are repeating units of the formula:

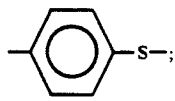

the nucleating agent added to the reaction system in step (c) of the inventive method is a poly(arylene ether/ketone), a poly(arylene sulfide/ketone), or a combination thereof; and the nucleating agent is added to the reaction system in an amount in the range of from about 0.2% to about 5% by weight based on the combined weight of the nucleating agent and of the dihalo-arylene reactant compound(s) being used to produce the crystallizable arylene sulfide polymer. The poly(arylene ether/ketone) and/or poly(arylene sulfide/ketone) nucleating agent is most preferably added to the reaction system in an amount in the range of from about 0.5% to about 2% by weight based on the combined weight of the nucleating agent and the dihalo-arylene reactant compound(s). These preferred nucleating agent addition ranges provide good morphological results at a low cost. Further, the addition of a poly(arylene ether/ketone) and/or a poly(arylene sulfide/ketone) nucleating agent in an amount within either of these preferred ranges will not significantly detract from the thermal resistance and chemical resistance properties of the crystallizable arylene sulfide polymer produced in step (b).

The nucleating agent used in the present invention is preferably added to the reaction system in step (c) of the inventive resin composition production method in the form of a nucleating agent slurry. The nucleating agent slurry will typically comprise the nucleating agent, in powdered form, and a carrier liquid. The carrier liquid used in the nucleating agent slurry is preferably identical to the solvent which is being used in the polymerization reaction system. The use of a nucleating agent slurry simplifies the nucleating agent addition step of the invention resin composition production method. Additionally, a nucleating agent slurry will blend quickly and easily with the other components of the reaction system, particularly when a stirred reaction vessel or similar reaction system is used.

The carrier liquid of the nucleating agent slurry can generally be water or any polar organic compound which has been used heretofore as a reaction solvent for the solution polymerization of arylene sulfides. Examples of such polar organic compounds include: formamide; acetamide; N-methylformamide; N,N-dimethylformamide; N,N-dimethylacetamide; N-ethylpropionamide; N,N-dipropyl-butyramide; 2-pyrrolidone; N-methyl-2-pyrrolidone; ε-caprolactam; N-methyl-ε-caprolactam; N,N'-ethylene di-2-pyrrolidone; hexamethylphosphoramide; tetramethylurea; and mixtures thereof.

Preferably, both the polymerization solvent and the nucleating agent slurry carrier liquid are N-methyl-2-pyrrolidone. N-methyl-2-pyrrolidone is an effective solvent which is readily recoverable from the polymerization system. Due to its low freeze point, N-methyl-2-pyrrolidone is also easily stored and handled.

The nucleating agent slurry should contain a sufficient amount of carrier liquid to facilitate handling and reaction system injection. Typically, the slurry will contain about 1 pound of powdered nucleating agent per gallon of carrier liquid.

The novel poly(arylene sulfide) resin composition provided by the present invention is preferably recovered from the reaction system in step (d) of the inventive resin composition production method using either the solvent flashing technique or the quench recovery technique discussed above. If the solvent flashing technique is used, the nucleating agent is preferably added to the reaction system after the concentration step and before the reheating and repressurizing step (i.e., before the remainder of the polar organic solvent is flashed away). If the quench recovery technique is used, the nucleating agent is preferably added to the reaction system after the polymerization reaction is essentially complete and before the reaction system quenching step.

The novel PAS resin composition recovered in step (d) of the inventive resin composition production method can be washed, dried, and ground to a finely divided form using techniques which are commonly used for washing, drying and grinding raw thermoplastic polymer resins. Examples of suitable washing techniques include acid washing, deionized water washing, and calcium acetate washing. Examples of suitable grinding techniques include air milling and ball milling. Fillers, reinforcements, processing aids, pigments, stabilizers, corrosion inhibitors, and the like which are typically used in combination with PAS resins can, in like manner, be blended with or otherwise used in combination with the inventive PAS resin composition.

The inventive PAS resin composition can be molded to form finished articles using generally any of the molding techniques (e.g., injection molding, compression molding, etc.) which are commonly used for molding PAS resins. In order to promote the formation of a fine-grained crystalline morphology, the inventive composition is preferably (a) molded at a temperature which is at least about 10° C. greater than the melting temperature of primary PAS resin component of the inventive composition and (b) allowed to cool at a rate of less than about 50° C. per minute. The inventive resin composition is most preferably molded at a temperature in the range of from about 25° C. to about 75° C. above the melting point of the primary PAS resin component of the inventive composition and then allowed to cool at a rate in the range of from about 1° C. to about 10° C. per minute. Methods and devices suitable for heating, molding, and cooling the inventive resin composition in the manner just discussed are described, for example, in U.S. Pat. No. 4,690,972.

As indicated hereinabove, the present invention also provides (1) a novel method of producing a continuous fiber-reinforced poly(arylene sulfide) composite and (2) a novel composite produced by said method. The inventive composite production method generally comprises the step of impregnating a continuous fiber material with a poly(arylene sulfide) resin composition wherein the poly(arylene sulfide) resin composition (a) comprises a crystallizable arylene sulfide polymer and nucleating agent and (b) is produced according to the inventive resin composition production method described hereinabove.

The continuous fiber material used in the inventive composite production method can generally be any continuous glass fiber material, carbon fiber material, aramid fiber material, or other continuous fiber material which is typically used for preparing continuous fiber-reinforced poly(arylene sulfide) composites.

When the inventive PAS resin composition is used for the production of continuous fiber-reinforced composites, the primary PAS resin component of the inventive composition preferably has a melt flow rate of at least about 30 g/10 minutes and most preferably has a melt flow rate of at least about 300 g/10 minutes. Unless stated otherwise, polymer flow rates provided herein and in the claims are determined according to ASTM D1238-79, Procedure B, at 316° C. using a 5 kg weight and a 0.17 mm orifice. Techniques for obtaining desired PAS resin melt flow rates (e.g., the use of reaction system modifiers, curing techniques, etc.) are well known in the art.

The novel poly(arylene sulfide) resin composition preferred for use in the inventive composite production method comprises: (a) a polymeric nucleating agent (most preferably, a poly(arylene etherether ketone), a poly(phenylene sulfide/ketone), or a combination thereof) and (b) a phenylene sulfide polymer, as described above, wherein at least about 90% of the divalent polymeric repeating units are unsubstituted p-phenylene sulfide repeating units. The novel resin composition used in the inventive composite production method is also preferably a resin composition which has been recovered using the above-described solvent flashing technique. The novel resin composition used in the composite production method is most preferably a composition which has been recovered using the above-described solvent flashing technique wherein the nucleating agent is added to the reaction system after the concentration step and before the reheating and repressurization step (i.e., before the remainder of the reaction system solvent is flashed away).

In carrying out the inventive composite production method, the continuous fiber reinforcement material can be impregnated with the novel PAS resin composition of the present invention using, for example, generally any pultrusion technique which is suitable for producing continuous fiber-reinforced PAS composites. However, the continuous reinforcement material is preferably impregnated with the novel resin composition using a slurry pultrusion technique of the type described in U.S. Pat. Nos. 4,690,972 and 4,680,224, the entire disclosures of which are incorporated herein by reference. To prepare the inventive PAS resin composition for the slurry pultrusion process, the inventive composition is ground to a finely divided form in the manner discussed above and slurried with an inert carrier liquid (e.g., water). Depending primarily on the type of shaping system (e.g., dies, rollers, or a combination thereof) and the number of continuous fibers strands used in the pultrusion process, the novel composites of the present invention can be produced in the form of tapes, rods, sheets, and the like. Composite tapes formed by the inventive composite production method can be wound on mandrels for later rewinding and use or for the formation of hollow, shaped objects such as tubes and pipes.

If desired, the resin composition matrix of the inventive composite can be solidified to a fine-grained morphology during the pultrusion process by heating the composite to a temperature which is at least about 10° C. greater than the melting point of the primary PAS resin component of the inventive resin composition matrix and then allowing the resin matrix to cool at a rate of less than about 50° C. per minute. The composite is preferably heated to a temperature in the range of from about 25° C. to about 75° C. above the melting point of the primary PAS resin component of the inventive resin matrix and then allowed to cool at a rate in the range of from about 1° to about 10° C. per minute.

Alternatively, the novel composite of the present invention can be produced in the form of a continuous, semi-processed sheet of plastic impregnated material (i.e., a prepreg). Such prepregs are particularly well suited for use in the production of high strength laminates. A laminate structure can be produced from the prepreg material, for example, by: cutting the prepreg into plate-like pieces of desired length; stacking a plurality of the plate-like pieces; and then compression molding the prepreg stack to form a finished laminate product of desired shape. In order to obtain a laminate product wherein the inventive PAS resin composition matrix is solidified to a fine-grained crystalline morphology, the prepreg stack should be compression molded at a temperature which is at least about 10° C. greater than the melting temperature of the primary PAS resin component of the inventive resin composition and then cooled at a rate of less than about 50° C. per minute. Preferably, the prepreg stack is compression molded at a temperature in the range of from about 25° C. to about 75° C. above the melting temperature of the primary PAS resin component and then cooled at a rate in the range of from about 1° C. to about 10° C. per minute.

Preferred techniques for impregnating continuous fiber reinforcement materials in accordance with the inventive composite production method to produce prepregs are described, for example, in U.S. Pat. Nos. 4,680,224 and 4,690,972.

The following examples are presented in order to further illustrate the present invention.

COMPARATIVE EXAMPLE I

An aqueous sodium sulfide solution was prepared by first charging (1) 71.72 pounds of an aqueous 49.89% by weight sodium hydroxide solution and (2) 86.21 pounds of an aqueous solution containing 16.22% by weight sodium hydrosulfide and 0.36% by weight sodium sulfide to a stirred 50 gallon neutralization vessel. The contents of the neutralization vessel were then stirred and heated to about 116° C.

28 pounds of dry solid sodium acetate and 146.2 pounds of N-methyl-2-pyrrolidone were charged to a 90 gallon polymerization reactor. The polymerization reactor was subsequently blocked in and flushed three times with nitrogen. Next, the contents of the neutralization vessel were transferred to the polymerization reactor. Following this transfer, 136.8 pounds of N-methyl-2-pyrrolidone were flushed through the neutralization vessel and into the polymerization reactor.

Following the neutralization vessel transfer and flushing procedure, the contents of the polymerization vessel were heated from a temperature of about 108° C. to a temperature of about 205° C. over a period of about 72 minutes. Water vapor generated during this heating interval was vented to a fractionation column. During the 72 minute heating interval, a total of 63.4 pounds of water was condensed in the fractionation column.

Next, 135.15 pounds of molten (214° C.) p-dichlorobenzene was pressured into the polymerization vessel. Subsequently, the contents of the polymerization vessel were heated to 227° C. and then maintained at 227° C. for a period of about three hours. At the end of the three hour temperature hold, the polymerization vessel pressure had increased from a pressure of 24 psig to a pressure of 72 psig.

Subsequently, the contents of the polymerization vessel were heated to a temperature of about 266° C. The polymerization vessel temperature was maintained at about 266° C. for a period of two hours. At the end of this two hour period, the polymerization vessel pressure had increased to about 172 psig. Midway through the 266° C. temperature hold, a mixture consisting of seven milliliters of 1,2,4-trichlorobenzene in two gallons of N-methyl-2-pyrrolidone was injected into the polymerization vessel.

Following the two hour 266° C. temperature hold, the polymerization vessel was vented over a 63 minute period in order to reduce the pressure of the polymerization vessel from 172 psig to 70 psig. During this pressure reduction (or flashing) period, the temperature of the polymerization vessel was maintained at or near 266° C. Subsequently, five pounds of deionized water was pressured into the polymerization vessel and the polymerization vessel was heated to 281° C. At the end of this heating period, the polymerization vessel pressure was about 90 psig. Next, the contents of the polymerization vessel were transferred to a stirred ribbon blender. The blender was maintained at a pressure of about 0.05 psig. During this transfer period, about 285.4 pounds of blender overhead vapor was produced and subsequently condensed. Following the transfer/vaporization step, a solid, salt filled polymer product was recovered from the blender.

The crude polymer product was cooled, ground, and transported to a wash tank. The polymer was washed one time in 120 gallons of tap water at a temperature of about 29° C. The polymer was then filtered on a belt filter using an 82° C. deionized water spray rinse. Next, the polymer was hot washed two times in 80 gallons of 177° C. deaerated tap water. The polymer slurry produced as a result of the second hot water wash was cooled to 49° C. and filtered on a belt filter using an 82° C. deionized water spray rinse. The polymer product was then dried in a steam tube dryer. Following the drying step, 87.5 pounds of dry product polymer were recovered.

EXAMPLE I

A reaction mixture was prepared and reacted in a polymerization vessel using the procedures set forth in Comparative Example I. The reaction procedure was conducted using 71.72 pounds of an aqueous 49.89% by weight sodium hydroxide solution, 86.21 pounds of an aqueous solution containing 16 22% by weight sodium hydrosulfide and 0.36% by weight sodium sulfide, 28 pounds of anhydrous sodium acetate, 146.2 pounds of N-methyl-2-pyrrolidone solvent, 136.8 pounds of N-methyl-2-pyrrolidone flush, 135.21 pounds of molten p-dichlorobenzene, and 7 milliliters of 1,2,4-trichlorobenzene in two gallons of N-methyl-2-pyrrolidone. At the end of the reaction procedure, the polymerization vessel temperature was 265.5° C. and the polymerization vessel pressure was 166 psig.

Following the reaction procedure, the reaction mixture was concentrated by reducing the reaction vessel pressure from 166 psig to 71 psig while maintaining a temperature of 266° C. Next, six pounds of a poly(p-phenylene sulfide/ketone) (PPSK) slurry were added to the concentrated reaction mixture. The PPSK slurry consisted of one pound of PPSK in five pounds of deionized water. The PPSK used was a p-phenylene sulfide homopolymer composed of repeating units of the formula:

Following PPSK slurry addition, 87.4 pounds of dry polymer resin material were obtained from the reaction system using the flashing and washing procedures described in Comparative Example I.

Various properties of the finished polymer resins obtained in Comparative Example I and Example I are set forth in Table I. As seen in Table I, the present invention provides a PAS resin composition having significantly improved crystallization characteristics. As indicated in Table I, the inventive resin composition exhibits a substantially higher melt crystallization temperature ($T_{mc}$), a substantially higher $T_{mc}$ Onset, a significantly lower cold crystallization temperature ($T_{cc}$), a much wider crystallization window (CW), and a significantly greater bulk density. As will be understood by those skilled in the art, these changes indicate that, as compared to the resin composition of Comparative Example I, the inventive composition of Example I crystallizes more rapidly and extensively and forms a tighter, finer-grained crystalline structure.

TABLE I

| Properties | Polymer Resin Composition | |
|---|---|---|
| | Compar. I | Example I |
| $T_g$ (°C.)[1] | 92 | 93 |
| $T_g$ Onset (°C.)[2] | 89 | 90 |
| $T_{cc}$ (°C.)[3] | 148 | 136 |
| $T_{cc}$ Onset (°C.)[4] | 135 | 128 |
| $T_m$ (°C.)[5] | 277 | 277 |
| $T_m$ Onset (°C.)[6] | 258 | 259 |
| $T_{mc}$ (°C.)[7] | 208 | 225 |
| $T_{mc}$ Onset (°C.)[8] | 221 | 234 |
| CW[9] | 32.4 | 48.4 |
| Bulk Density (Lbs/ft$^3$) | 15.0 | 17.9 |

TABLE I-continued

| | Polymer Resin Composition | |
|---|---|---|
| Properties | Compar. I | Example I |
| Melt Flow (g/10 min.)[10] | 257 | 169 |

[1]Glass transition temperature.
[2]Temperature at initiation of glass transition
[3]Cold crystallization temperature.
[4]Temperature at initiation of cold crystallization.
[5]Melt temperature.
[6]Temperature at which melting begins.
[7]Melt crystallization temperature - temperature at which maximum excess heat release occurs when crystallizing molten polymer by cooling from 320° C.
[8]Temperature of initiation of crystallization when cooling from the molten state.
[9]Crystallization window = $[(T_{mc}-T_{cc})/(T_m-T_g)] \times 100$
[10]Determined according to ASTM D1238-79, Procedure B at 316° C. using a 5 kg weight and a 0.17 mm orifice.

EXAMPLE II

A first slurry composition is prepared using the inventive resin composition produced in Example I. To prepare the first slurry composition, the composition of Example I is ground to a powder form by air milling. Next, 1100 g of the powdered composition are blended with 16,000 mL of water and 11.3 g of an ethyloxylated octyl phenol surfactant.

A second slurry composition is prepared using the poly(phenylene sulfide) (PPS) resin produced in Comparative Example I. To prepare the second slurry composition, the PPS resin produced in Comparative Example I is ground to a powder form by air milling. The powdered PPS resin is then dry blended with a PPSK nucleating agent which has also been air milled to a powder form. Next, 1100 g of the resulting PPS/PPSK mixture are blended with 16,000 mL of water and 11.3 g of an ethyloxylated octyl phenol surfactant.

The powdered PPSK nucleating agent used in preparing the second slurry composition is identical to the PPSK nucleating agent used in Example I and is blended with the powdered PPS resin of Comparative Example I in an amount such that the PPS:PPSK weight ratio of the resulting blend is identical to the PPS:PPSK weight ratio of the composition produced in Example I. Thus, the PPS:PPSK weight ratio of the second slurry composition is identical to the PPS:PPSK weight ratio of the first slurry composition.

Next, the first slurry composition is used to prepare a continuous, carbon fiber-reinforced prepreg tape. To produce the prepreg tape, a band consisting of multiple strands (e.g., 13 strands) of a continuous carbon fiber material is pulled through the first slurry composition. As the band passes through the slurry, it is coated with the resin composition of Example I. After passing through the slurry, the band is heated and shaped in a heated die. The heated die is maintained at a temperature sufficient to soften and/or melt the resin composition as the coated band passes through the die. The heating, squeezing, and shaping action of the die forces the resin composition into the fiber material and provides a thoroughly impregnated prepreg tape.

Subsequently, the prepreg tape formed from the first slurry composition is used to form a composite laminate. To produce the composite laminate, the prepreg tape is cut to provide prepreg strips. These strips are seamed, if necessary, to form sheets of a desired width. A number of prepreg sheets sufficient to fill an aluminum picture frame mold are stacked and placed in said mold. The filled mold is then heated to 320° C. in a Pasadena 50 ton laboratory press. The heated mold is initially held in the press for 4 minutes with no applied pressure. Next, the heated mold is held in the press for 4 minutes with an applied pressure of 150 psig. The resulting mold is then allowed to cool at a rate of about 1° C. per minute.

A prepreg tape and a composite laminate are also prepared from the second slurry composition. The procedures used for preparing a prepreg tape and composite laminate from the second slurry composition are identical to the procedures used for preparing a prepreg tape and a composite laminate from the first slurry composition.

The composite laminate prepared from the first slurry composition (i.e., the slurry prepared using the inventive composition of Example I) is superior to the composite laminate prepared from the second slurry composition (i.e., the slurry prepared by dry blending the PPS resin of Comparative Example I with PPSK). The resin matrix of the laminate prepared from the Example I composition comprises a much more consistent and uniform blend of PPS resin and PPSK nucleating agent. Thus, the resin matrix of the Example I composition laminate crystallizes to a more uniform fine-grained morphology, exhibits greater overall strength, exhibits greater overall impact resistance, and is more nearly free of microcracks.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of preparing a continuous fiber-reinforced composite comprising the step of impregnating a continuous fiber material with a poly(arylene sulfide) resin composition by a pultrusion process wherein said poly(arylene sulfide) resin composition is originally in a solid, finely-divided form and said continuous fiber material is coated with said solid, finely-divided poly(arylene sulfide) resin composition by pulling said continuous fiber material through said solid, finely-divided poly(arylene sulfide) resin composition, wherein said solid, finely-divided poly(arylene sulfide) resin composition comprises a crystallizable arylene sulfide polymer and a nucleating agent and said solid, finely-divided poly(arylene sulfide) resin composition has been produced by a method comprising the steps of:

(a) forming a reaction system, said reaction system initially comprising (i) polymerization reactants which are reactable to form said crystallizable arylene sulfide polymer and (ii) a solvent;

(b) reacting said polymerization reactants to form said arylene sulfide polymer;

(c) after step (a), adding said nucleating agent to said reaction system; and (d) after steps (b) and (c), recovering said poly(arylene sulfide) resin composition from said reaction system.

2. The method of claim 1 wherein said step of impregnating is conducted using a slurry pultrusion process.

3. The method of claim 1 wherein at least about 90% of the repeating units of said crystallizable arylene sulfide polymer are repeating units of the formula:

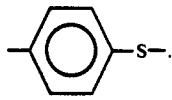

4. The method of claim 1 wherein said nucleating agent is added to said reaction system as a nucleating agent slurry and said nucleating agent slurry comprises said nucleating agent and a carrier liquid.

5. The method of claim 1 wherein:
said method of producing said poly(arylene sulfide) resin composition further comprises the step, prior to step (d), of concentrating said reaction system by removing a portion of said solvent therefrom; and said nucleating agent is added to said reaction system after said step of concentrating and prior to step (d).

6. A continuous fiber-reinforced composite produced by the method of claim 1.

7. A continuous fiber-reinforced composite produced by the method of claim 3.

8. A continuous fiber-reinforced composite produced by the method of claim 5.

* * * * *